United States Patent
Everitt et al.

[11] Patent Number: 5,520,466
[45] Date of Patent: May 28, 1996

[54] FLANGED BEARINGS

[75] Inventors: William H. Everitt, Horley; David A. Parker; Glyndwr J. Davies, both of Rugby, all of England

[73] Assignee: T&N Technology Limited, Rugby, England

[21] Appl. No.: 244,676

[22] PCT Filed: Dec. 17, 1992

[86] PCT No.: PCT/GB92/02338

§ 371 Date: Jun. 7, 1994

§ 102(e) Date: Jun. 7, 1994

[87] PCT Pub. No.: WO93/13324

PCT Pub. Date: Jul. 8, 1993

[30] Foreign Application Priority Data

Dec. 21, 1991 [GB] United Kingdom ............... 9127191

[51] Int. Cl.$^6$ .............................. F16C 9/02; F16C 33/02
[52] U.S. Cl. .................. 384/294; 384/296; 384/429; 384/297; 384/124
[58] Field of Search .................... 384/125, 124, 384/215, 216, 294, 295, 296, 275, 276, 288, 297–300, 429, 430

[56] References Cited

U.S. PATENT DOCUMENTS

| 2,675,283 | 4/1954 | Thomson . | |
|---|---|---|---|
| 2,776,175 | 1/1957 | Waite | 384/294 |
| 2,884,661 | 5/1959 | Hurley | 264/251 |
| 3,104,136 | 9/1963 | Merriman | 384/296 |
| 3,130,991 | 4/1964 | Piragino | 384/125 X |
| 3,575,787 | 4/1971 | Pietrocini | 384/300 X |
| 3,713,714 | 1/1973 | Hill et al. . | |
| 4,362,341 | 12/1982 | Matsumoto et al. | 384/429 X |
| 4,707,149 | 11/1987 | Hahle | 384/294 |
| 4,810,105 | 3/1989 | Arlott et al. | 384/275 X |
| 5,192,136 | 3/1993 | Thompson et al. | 384/294 |

FOREIGN PATENT DOCUMENTS

| 0392169 | 10/1990 | European Pat. Off. . | |
| 2530472 | 1/1977 | Germany | 384/303 |
| 3309792 | 9/1984 | Germany | 384/429 |
| 270913 | 11/1988 | Japan | 384/430 |
| 793938 | 4/1958 | United Kingdom | 384/429 |

Primary Examiner—Thomas R. Hannon
Attorney, Agent, or Firm—Synnestvedt & Lechner

[57] ABSTRACT

A flanged half bearing (10;50) comprises a shell portion (12;52) which provides a bearing surface (14;54) against which a shaft can rotate. A flange portion (16,18;56,58) of the bearing provides a thrust surface (20,22;60,62) to resist axial movement of the bearing. The thrust surface (20,22;60, 62) is formed from injection moulded plastics material either integrally with the shell portion (12;52) or a layer thereof, or the flange portion is injection moulded as a separate piece and secured to the shell portion.

10 Claims, 1 Drawing Sheet

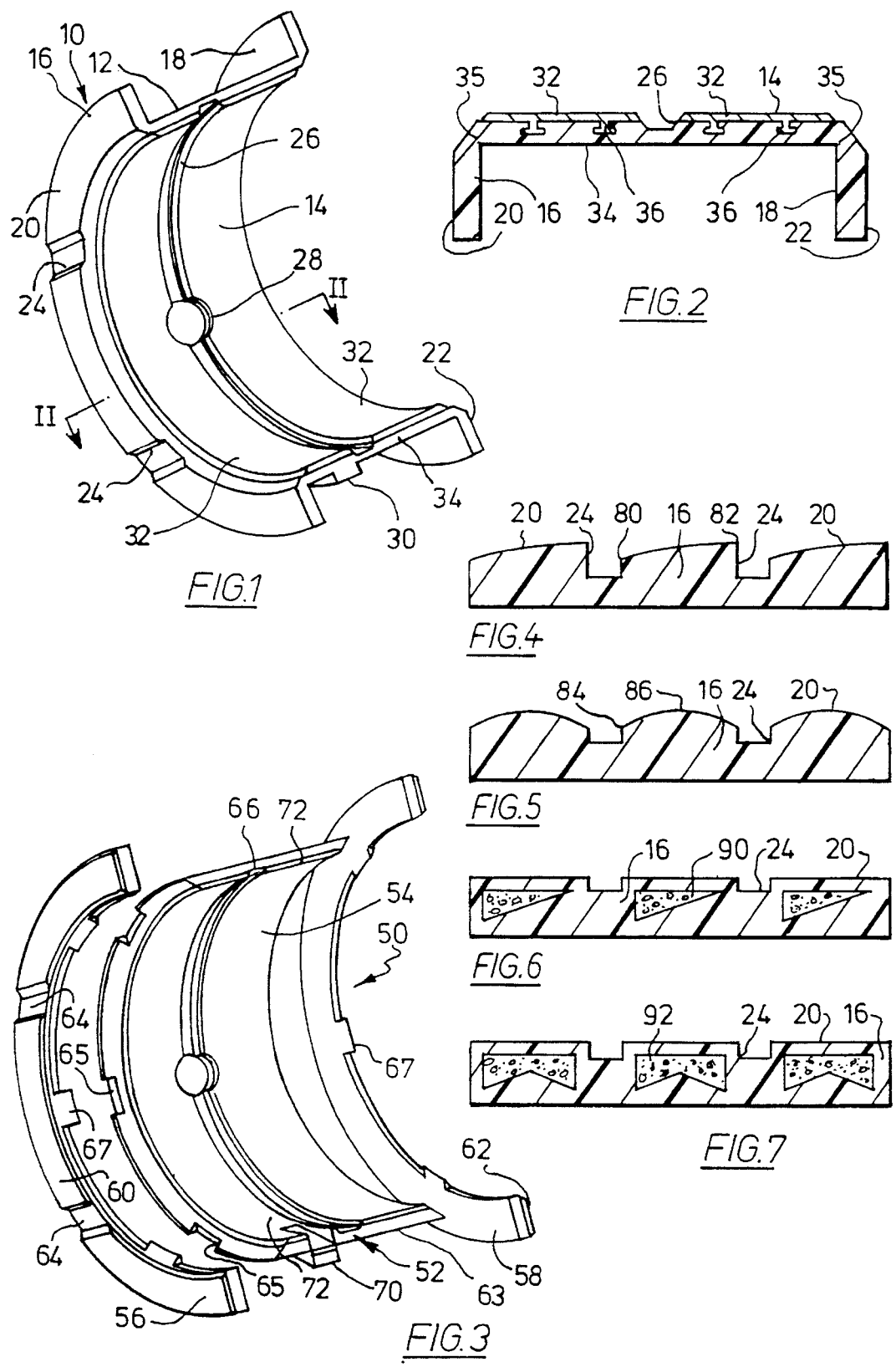

FLANGED BEARINGS

This invention is concerned with flanged half bearings and with methods of manufacturing such bearings.

Flanged half bearings are used, for example, for supporting crankshafts for rotation in crank cases. The bearings are manufactured as half bearings for assembly purposes and a full bearing is provided by two half bearings each embracing half of the shaft. Each half bearing has a plain bearing surface against which the shaft can rotate, this surface being provided by a shell portion which comprises a layer of bearing material, such as aluminium tin alloy, mounted on a steel backing layer. The flange portion of the half bearing extends radially outwardly at one axial end of the bearing and provides a thrust surface which enables the flange portion to act as a thrust washer to prevent axial movement of the bearing. The thrust surface has a plurality of radially extending grooves therein which assist in the distribution of oil. There may be a further similar flange portion at the opposite axial end of the bearing. Such flange portions also comprise a layer of metal bearing material mounted on a steel backing layer. Conventionally, such flanged half bearings either have the backing layers of the or each flange portion and the backing layer of the shell portion formed integrally, which is a difficult operation, or have the backing layers formed separately and mechanically secured together, which requires time-consuming assembly operations.

It is an object of the present invention to provide a flanged half bearing which is easier to manufacture than conventional flanged half bearings.

The invention provides a flanged half bearing comprising a shell portion providing a plain bearing surface against which a shaft can rotate, and a flange portion extending radially outwardly at one axial end of the bearing, the flange portion providing a thrust surface to resist axial movement of the bearing, characterised in that the thrust surface is formed from injection moulded plastics material.

A flanged half bearing, according to the invention, can be more easily manufactured than a conventional all-metal half bearing, because, if the construction is integrally moulded, no forming operation is required and, if the flange portion is formed separately, the resilience of the plastics material can be used to assist the mechanical connection between the components giving a simple assembly operation. Furthermore, the flange portion can have oil grooves and, if desired, oil film formation-enhancing shapes, moulded into it without machining being required.

A half bearing, according to the invention, may also comprise a further flange portion extending radially outwardly at the other axial end of the bearing, the further flange portion providing a further thrust surface which is also formed from injection moulded plastics material. Since a further flange portion is involved, the manufacture of the half bearing is further facilitated in comparison with a conventional half bearing with two flanges.

The shell portion of a bearing according to the invention may comprise a layer of bearing material, e.g. metal, providing the plain bearing surface, and a backing layer on which the bearing material layer is mounted, the backing layer being joined to the or each flange portion. This enables the advantages of a metal bearing surface to be combined with the advantages of a plastics thrust surface. The backing layer may be formed from injection moulded plastics material which can be moulded as one piece with the or each flange portion, thereby joining the shell portion to the or each flange portion. For example, a plastics hinge may join the or each flange portion to the backing layer, giving the possibility that the flange portion or portions can move to a limited extent axially relative to the shell portion. Such a possibility is advantageous in operation as it allows the bearing to conform under operating conditions. The bearing material layer, may have keying means, e.g. bulbous projections therefrom, which is embedded in the backing layer, e.g. by moulding the backing layer around the keying means, to secure the layers of the shell portion together. Headed studs or apertured lugs provided alternative forms of keying means.

Where the flange portion or portions are injection moulded as separate pieces, which are then attached to the shell portion, the portions may be joined by projections which project from one of the portions and are retained in recesses in another of the portions. The projections may be loosely retained in the recesses so that the or each flange portion can move axially to a limited extent relative to the shell portion. Alternatively, the projections may be an interference fit in the recesses.

Since the plastics material can readily be moulded into complex shapes, the or each thrust surface of a half bearing according to the invention can be profiled to provide one or more wedge-shaped portions extending along the thrust surface. Such portions, in the use of the bearing, act to promote the formation of a hydro-dynamic film of oil across the thrust surface. Such portions may, for example, commence at an oil groove and extend to the next oil groove around the thrust surface. Alternatively, such portions may commence at an oil groove and extend half or less of the way to the next oil groove, a further such portion extending in the opposite circumferential direction from said next oil groove so that the thrust surface can operate in either direction.

The formation of a hydro-dynamic film of oil across the thrust surface can alternatively be promoted by forming the or each flange portion as a hollow injection moulding containing one or more chambers. These chambers can be shaped so that the thrust surface adopts oil film enhancing wedge shapes in use. For example, the or each chamber may be wedge-shaped in the direction of the thrust surface. The or each chamber may be filled with material, e.g. by sandwich moulding, which is more resilient than the plastics material forming the thrust surface.

The invention also provides a method of manufacturing a flanged half bearing according to the invention, the method comprising placing a layer of bearing material adapted to provide the plain bearing surface of the shell portion of the bearing in the mould of an injection moulding machine and injecting plastics material into the mould so that the plastics material forms said flange portion and, on solidification, bonds the flange portion to the shell portion.

The invention also provides a method of manufacturing a flanged half bearing according to the invention, the method comprising injection moulding from plastics material a flange adapted to form the flange portion of the half bearing, and, after solidification of the plastics material, securing said flange to a shell adapted to form the shell portion of the bearing.

There now follow detailed descriptions, to be read with reference to the accompanying drawings, of two half bearings and methods of manufacturing them which are illustrative of the invention.

In the drawings:

FIG. 1 is a perspective view of the first illustrative half bearing;

FIG. 2 is a cross-sectional view of the first illustrative half bearing;

FIG. 3 is a perspective view of the second illustrative half bearing, showing it in the course of assembly; and FIGS. 4 to 7 illustrate in cross-section alternative forms of flange portion for the first and second illustrative half bearings, each of these Figures showing a flange portion projected on to a plane extending along a diameter of the half bearing.

The first illustrative half bearing 10 comprises a shell portion 12 providing a generally semi-cylindrical plain bearing surface 14 of metallic bearing material, specifically aluminium tin alloy. In the use of the bearing 10, a shaft (not shown) can rotate against the surface 14. The half bearing 10 also comprises a flange portion 16 extending radially outwardly at one axial end of the bearing 10 and a further flange portion 18 extending radially outwardly at the other axial end thereof. The flange portions 16 and 18 both provide a thrust surface 20 and 22, respectively, to resist axial movement of the bearing 10. The thrust surfaces 20 and 22 are generally semi-annular and face away from the shell portion 12. The thrust surfaces 20 and 22 are formed from injection moulded plastics material.

The bearing 10 is intended for use as a crankshaft bearing with the crankshaft running on the surface 14 and the thrust surfaces 20 and 22 resisting axial movement. The thrust faces 20 and 22 are each provided with two radially-extending oil grooves 24, only those in the surface 20 being visible in FIG. 1. The surface 14 has a circumferential oil groove 26 in it leading to an oil supply hole 28.

A locating tag 30 projects from the outer surface of the shell portion 12 between the two flange portions 20 and 22.

The shell portion 12 comprises two metal layer portions 32 which together form a layer of bearing material providing the surface 14. The shell portion 12 also comprises an injection moulded plastics layer 34 on which the bearing material layer 32 is mounted. The layer 34 is joined to the flange portions 16 and 18 by plastics hinges 35. The metal layer portions 32 are both generally semi-annular and lie side-by-side on opposite sides of the groove 26 so that the inside surface of each portion 32 provides half of the plain bearing surface 14. The outside surface of each portion 32 is provided with keying means in the form of two circumferentially-extending bulbous ridges 36 (see FIG. 2). These ridges 36 are embedded in the material of the plastics portion 34 to secure the plastics layer 34 to the metal layer portions 32. The backing layer 34 and the flange portions 16 and 18 are injection moulded as one piece.

The plastics layer 34 and the flange portions 16 and 18 are made of polyetheretherketone or other suitable plastics material.

The illustrative method of manufacturing the flanged half bearing 10 comprises placing the metal layer portions 32, which are adapted to provide the surface 14 of the shell portion 12, in the mould of an injection moulding machine with the portions 32 in the relationship to one another which they have in the finished bearing 10. The surfaces of the metal portions 32 which make up the plain bearing surface 14 are positioned against surface portions of the mould or otherwise masked so that no plastics material adheres thereto. Plastics material is then injected into the mould to form the flange portions 16 and 18 and the backing layer of the shell portion 12. The plastics material flows around the ridges 36 so that, on solidification, the ridges 36 are embedded in the plastics material and the metal portions 32 are thereby secured to the plastics portion 34. Also, on solidification, the flange portions 16 and 18 are bonded to the shell portion 12. The tag 30 which is formed by the plastics material can be a portion of sprue left in the injection passage of the mould.

In modifications of the first illustrative half bearing, the thrust surfaces 20 and 22 can also be provided with a layer of metallic bearing material similar to the layer 32. It is also possible to dispense with such layers of metallic bearing material and to construct the half bearing inserts of plastics bearing material.

The second illustrative half bearing 50 comprises a shell portion 52 providing a surface 54 similar to the surface 14. The bearing 50 also has flange portions 56 and 58, similar to the flange portions 16 and 18, which have thrust faces 60 and 62 similar to the faces 20 and 22.

The bearing 50, however, differs from the bearing 10 in that the shell portion 52 is of all metal construction and the flange portions 56 and 58 are made of plastics material by injection moulding as separate pieces which are subsequently joined to the shell portion.

The shell portion 52 comprises a steel backing layer 63 on which a layer of aluminium-tin bearing material is formed in two portions 72 on opposite sides of an oil groove 66. The portions 72 provide the plain bearing surface 54. The axial end edges of the shell portion 52 are each provided with three circumferentially-spaced slots 65 which provide recesses for the attachment of the flange portions 56 and 58. A tag 70 is bent outwardly out from an axially-extending edge of the shell portion 52 and provides a location stop of the bearing 50.

The flange portions 56 and 58 are each provided with two oil grooves 64 and with three projections 67 arranged to form an interference fit in the recesses 65 to secure the plastics portions forming the flange portions 56 and 58 to the metal shell portion 52.

In the illustrative method of manufacturing the bearing 50, the shell portion 52 is formed by conventional metal forming techniques, the flange portions 56 and 58 are formed from plastics material by conventional injection moulding, and the flange portions 56 and 58 are secured to the shell 52 by forcing the projections 67 into the recesses 65, so that they are retained therein.

In modifications of the second illustrative half bearing, the projections 67 are replaced by projections, e.g. barbed projections, which enter the recesses and although retained therein allow limited axial movement of the flange portion relative to the shell portion.

The thrust surfaces 20, 22, 60 and 62 may be generally planar, apart from the oil grooves 24 and 64, as shown in FIGS. 1 to 3, or may be profiled around the surfaces as shown in FIGS. 4 or 5 to provide wedge-shaped surface portions extending along the surface which act in use to promote the formation of a hydro-dynamic film of oil across the thrust surface. FIG. 4 shows wedge-shaped portions which extend from a low point 80 adjacent a groove 24 to a high point 82 adjacent the next groove 24. FIG. 5 shows wedge-shaped portions which have a low point 84 adjacent a groove 24 and high points mid-way between grooves 24 so that the surface can operate equally in either direction.

FIGS. 6 and 7 show possibilities for causing the thrust surface to adopt wedge-shapes in use even though they are planar in a no-load condition, apart from the oil grooves 24 and 64. In FIG. 6, the flange portion is formed as a hollow injection moulding containing chambers 90 which are filled with resilient material (more resilient than the material forming the thrust surface). In this case, the resilient material is elastomeric foam. The chambers 90 are wedge-shaped in the direction of the thrust surface, having a narrow end and a wide end. The construction of FIG. 7 is the same as that of FIG. 6 except that the chambers 92 are wide at both ends and narrow in the middle, giving equal performance in both directions.

We claim:

1. A flanged half bearing comprising a shell portion which comprises a layer of bearing material and a backing layer on which the bearing material layer is fixedly mounted, the bearing material layer providing a plain bearing surface against which a shaft can rotate, the half bearing also comprising a flange portion joined to the backing layer, the flange portion extending radially outwardly from said shell portion at one axial end thereof, the flange portion providing a thrust surface to resist axial movement of the bearing, wherein the flange portion providing the thrust surface is formed from injection moulded plastics material.

2. A half bearing according to claim 1, wherein the bearing also comprises a further flange portion extending radially outwardly at the other axial end of the bearing, the further flange portion providing a further thrust surface which is also formed from injection moulded plastics material.

3. A half bearing according to claim 1, wherein the backing layer is formed from injection moulded plastics material.

4. A half bearing according to claim 3, wherein the plastics material of the backing layer and the plastics material of the flange portion are moulded as one piece.

5. A half bearing according to claim 4, wherein a plastics hinge joins the flange portion to the backing layer.

6. A half bearing according to claim 1, wherein the bearing material layer has keying means which is embedded in the backing layer to secure the layers of the shell portion together.

7. A half bearing according to claim 1, wherein the thrust surface is profiled to provide at least one wedge-shaped surface portion, extending along the thrust surface.

8. A half bearing according to claim 1, wherein the flange portion is formed as a hollow injection moulding containing at least one chamber.

9. A half bearing according to claim 8, wherein the at least one chamber is wedge-shaped in the direction of the thrust surface.

10. A half bearing according to claim 8, wherein the at least one chamber is filled with material which is more resilient than the plastics material forming the thrust surface.

* * * * *